United States Patent [19]

Daniels et al.

[11] Patent Number: 5,035,140
[45] Date of Patent: Jul. 30, 1991

[54] SELF CLEANING LIQUID LEVEL DETECTOR

[75] Inventors: James W. Daniels, Renton; Karl A. Hansen, Seattle, both of Wash.

[73] Assignee: The Boeing Company, Seattle, Wash.

[21] Appl. No.: 266,839

[22] Filed: Nov. 3, 1988

[51] Int. Cl.⁵ .............................................. G01F 23/00
[52] U.S. Cl. ................................................. 73/290 V
[58] Field of Search ................... 273/290 V; 340/621, 340/582; 367/908; 73/661

[56] References Cited

U.S. PATENT DOCUMENTS

| | | | |
|---|---|---|---|
| 2,960,678 | 11/1960 | Beard et al. | 340/1 |
| 3,019,650 | 2/1962 | Worswick | 73/290 |
| 3,079,596 | 2/1963 | Atkinson | 340/244 |
| 3,540,275 | 11/1970 | Post et al. | 73/290 |
| 4,107,994 | 8/1978 | Sogo | 73/290 V |
| 4,114,441 | 9/1978 | Magri | 73/290 V |
| 4,182,177 | 1/1980 | Prough | 73/290 V |
| 4,216,671 | 8/1980 | Kurland | 73/61 R |
| 4,248,087 | 2/1981 | Dennis et al. | 73/290 V |
| 4,287,774 | 9/1981 | Grebe, Jr. et al. | 73/861.17 |
| 4,320,659 | 3/1982 | Lynnworth et al. | 73/589 |
| 4,480,468 | 11/1984 | Sinha | 73/290 V |
| 4,491,008 | 1/1985 | Marini et al. | 73/19 |
| 4,535,627 | 8/1985 | Prost et al. | 73/290 B |
| 4,545,245 | 10/1985 | Sharp | 73/290 V |
| 4,570,482 | 2/1986 | Murata et al. | 73/290 V |
| 4,572,253 | 2/1986 | Farmer et al. | 141/95 |
| 4,580,448 | 4/1986 | Skrgatic | 73/290 V |
| 4,594,584 | 6/1986 | Pfeiffer et al. | 340/620 |
| 4,629,149 | 12/1986 | Carson et al. | 244/134 R |
| 4,775,118 | 10/1988 | Daniels | 244/134 D |

FOREIGN PATENT DOCUMENTS

| | | |
|---|---|---|
| 231518 | 3/1959 | Australia . |
| 205820 | 11/1983 | Japan ................. 73/290 V |
| 58-21522 | 12/1983 | Japan . |
| 4819 | 1/1985 | Japan ................. 73/290 V |
| 4820 | 1/1985 | Japan ................. 73/290 V |
| 798492 | 1/1981 | U.S.S.R. . |
| 818351 | 8/1959 | United Kingdom . |
| 839092 | 6/1960 | United Kingdom . |
| 997481 | 7/1965 | United Kingdom . |
| 2034470 | 6/1980 | United Kingdom ............. 73/290 V |

Primary Examiner—William A. Cuchlinski, Jr.
Assistant Examiner—W. Morris Worth
Attorney, Agent, or Firm—Finnegan, Henderson, Farabow, Garrett and Dunner

[57] ABSTRACT

A method of detecting an effluent level in an aircraft lavatory holding tank and a device for practicing the method. The device uses electrodynamic forces of different values generated by an electro-impulse solenoid to determine whether a detector is contaminated, to dislodge contaminants, and to measure the fluid level in the holding tank when the detector is clean enough to produce an accurate reading.

22 Claims, 7 Drawing Sheets

SELF CLEANING LIQUID LEVEL DETECTOR

FIELD OF THE INVENTION

This invention relates to an apparatus and a method for determining a fluid level in a container. More particularly, the invention relates to such a method and apparatus that is self-cleaning.

BACKGROUND OF THE INVENTION

For many years, transport aircraft have been equipped with on board lavatories and associated holding tanks for holding effluent from the lavatories. It is important that the level of effluent in the holding tanks be monitored.

Measuring the level of effluent in containers such as aircraft lavatory waste or holding tanks has traditionally been plagued by problems with the reliabilty of the empty and full sensors. A typical conventional design used an access-port-mounted flat plate sensor device. This sensor device was essentially one plate of a capacitor that sensed the capacitance change as the liquid level rose across the sensor's surface. However, solid waste contaminants would build up on the sensor's surface, thus masking the sensor's responses. Some conventional designs even included washer systems to rinse the sensor's surface when the tank was emptied, but contamination still occurred.

It is also known that the level of fuel in a tank can be detected by vibrating the wall of the structure and measuring the response. However, such vibrating sensors appear to have little advantage over a capacitance sensor as far as contamination is concerned.

Accordingly, a need exists for a liquid level detector that will operate accurately in a contaminated environment.

To achieve this capability, the detector should be able to determine when it is so contaminated that its accuracy is impaired and then clean itself.

SUMMARY OF THE INVENTION

In accordance with the purposes of the invention, as embodied and broadly described herein, apparatus for detecting the contents level of a container having a wall subject to fouling by contaminants comprises means responsive to input signals of first and second values for selectively applying first and second electrodynamic forces to a conductive surface mechanically coupled to the wall, the first electrodynamic force being less than the second electrodynamic force and the second electrodynamic force being operative to vibrate the wall sufficient to dislodge contaminants from the wall, means for sensing a parameter which is a function of the forces and of the contents level of the container, and means for generating an indicating signal representative of the parameter to indicate the contents level of the container.

The present invention is also directed to a method for detecting the contents level of a container having a wall subject to fouling by contaminants. The method comprises a first step of generating an input signal to apply to the wall a first mechanical force representative of the input signal, a second step of detecting a first parameter which is indicative of the contents level of the container and of the input signal, a third step of generating a first level-indicating signal from the detected first parameter if the detected first parameter indicates a contents level below a predetermined value, a fourth step of detecting a second parameter indicative of the contents level of the container, a fifth step of comparing the contents level indicated by the first and second parameters, a sixth step of generating a true level indicating signal if the first and second parameters both indicate a predetermined contents level, a seventh step of generating an input signal to apply to the wall a second mechanical force greater than the first mechanical force and sufficient to dislodge contaminants from the wall if the first and second parameters do not both indicate a predetermined contents level, and an eighth step of repeating the first through seventh steps.

BRIEF DESCRIPTION OF THE DRAWINGS

The accompanying drawings, which are incorporated in and constitute a part of this specification, illustrate at least one embodiment of the invention, and, together with the description, serve to explain the principles of the invention. Of the drawings.

DESCRIPTION OF THE PREFERRED EMBODIMENTS

Figure 1:
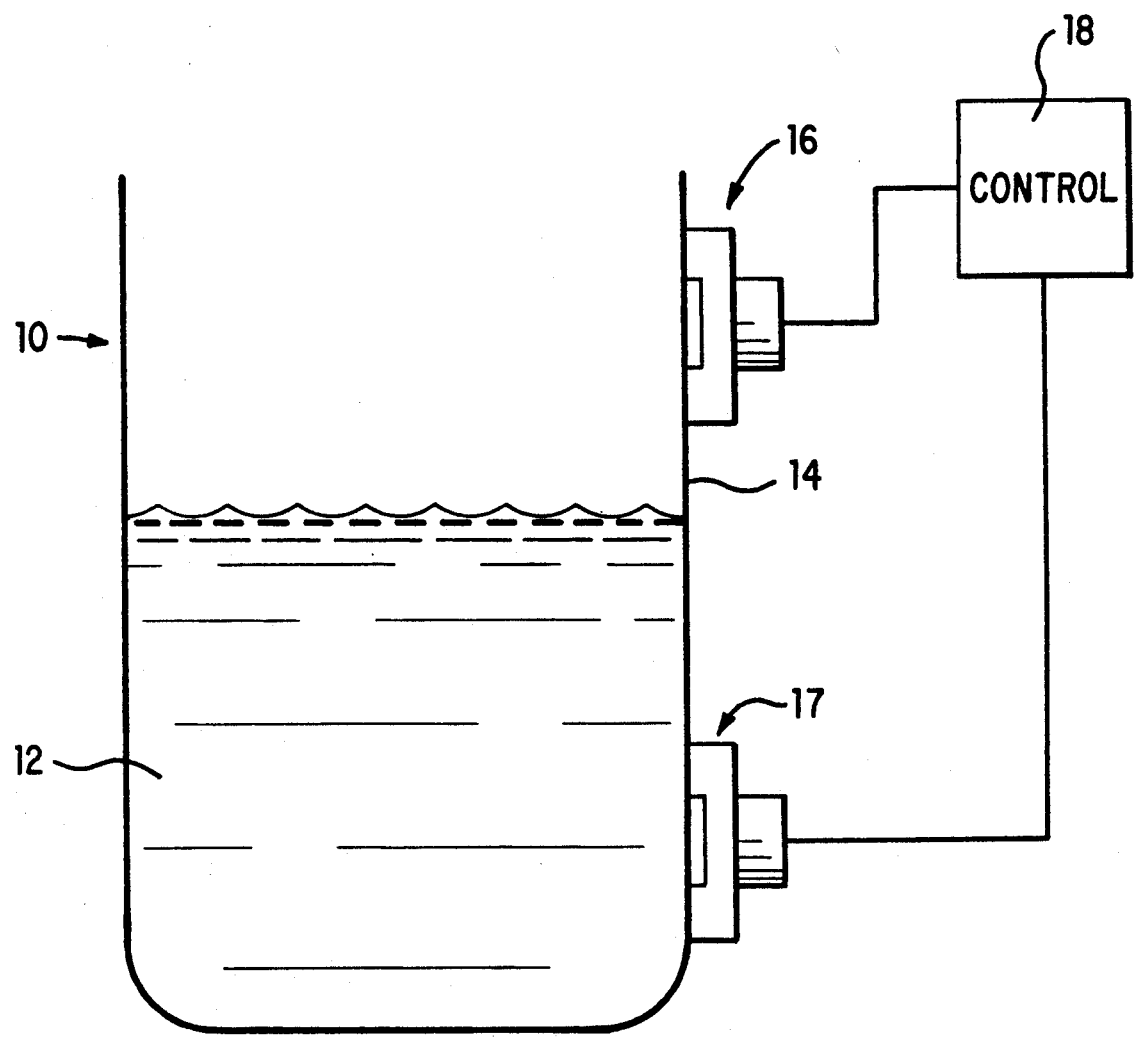
FIG. 1 is a side elevational view of an effluent holding tank including a detector and controller.

Referring now to the drawings, in which like reference characters refer to corresponding elements, FIG. 1 shows a system incorporating a preferred embodiment of the present invention. FIG. 1 is a side view of a container, or tank, 10 containing a level of liquid 12. Mounted on a wall 14 of tank 10 is at least one detector 16 which is connected to a controller 18. Additional detectors may be positioned vertically up and down wall 14 of tank 10 to provide indications of varying levels of liquid 12. For example, a detector 17 located near the bottom of wall 14 may be used to indicate that tank 10 is empty, while detector 16 located higher up wall 14 may be used to indicate that tank 10 is full.

Figure 2:
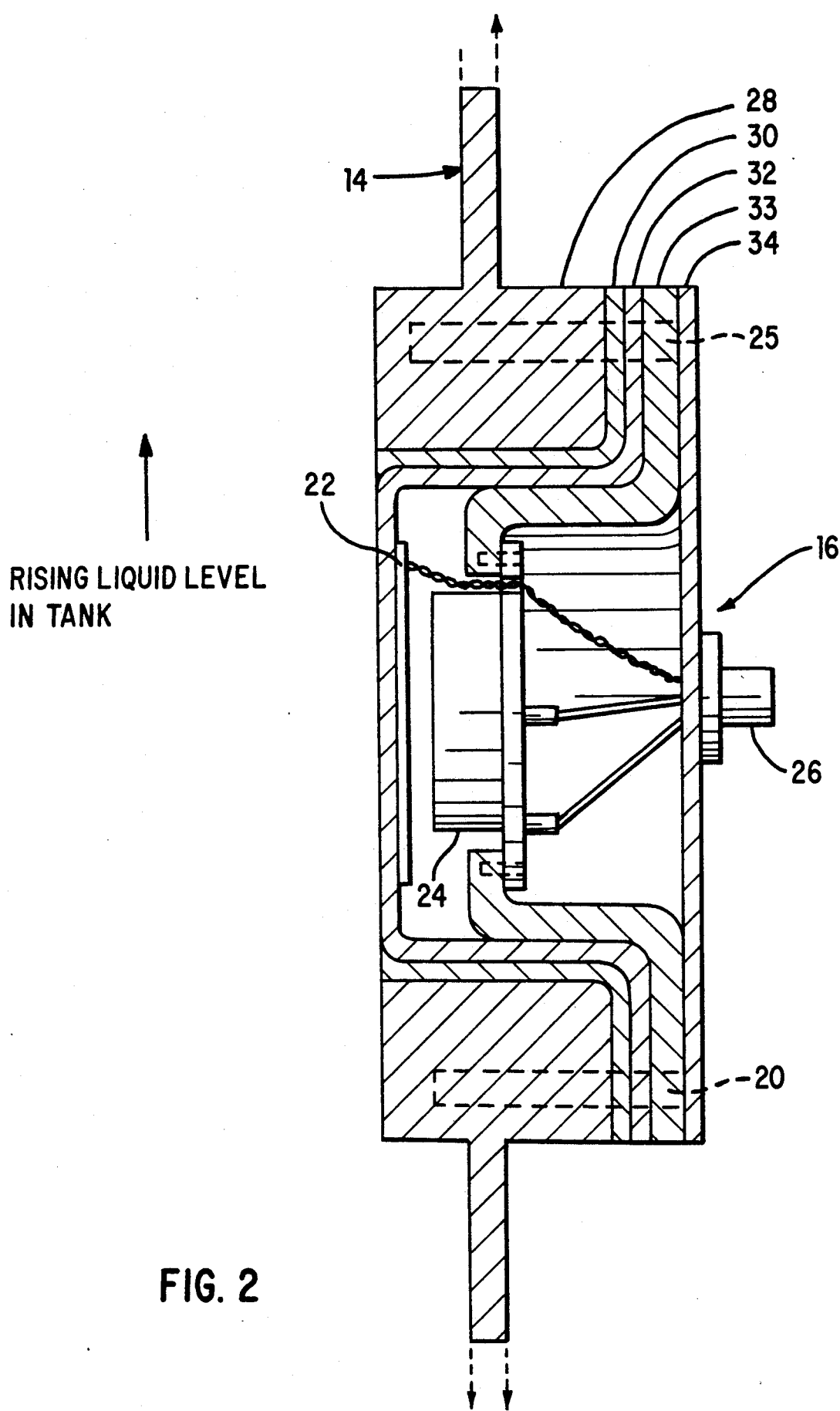
FIG. 2 is a detail side elevational view of a detector of FIG. 1 mounted in a tank wall.
Figure 3:
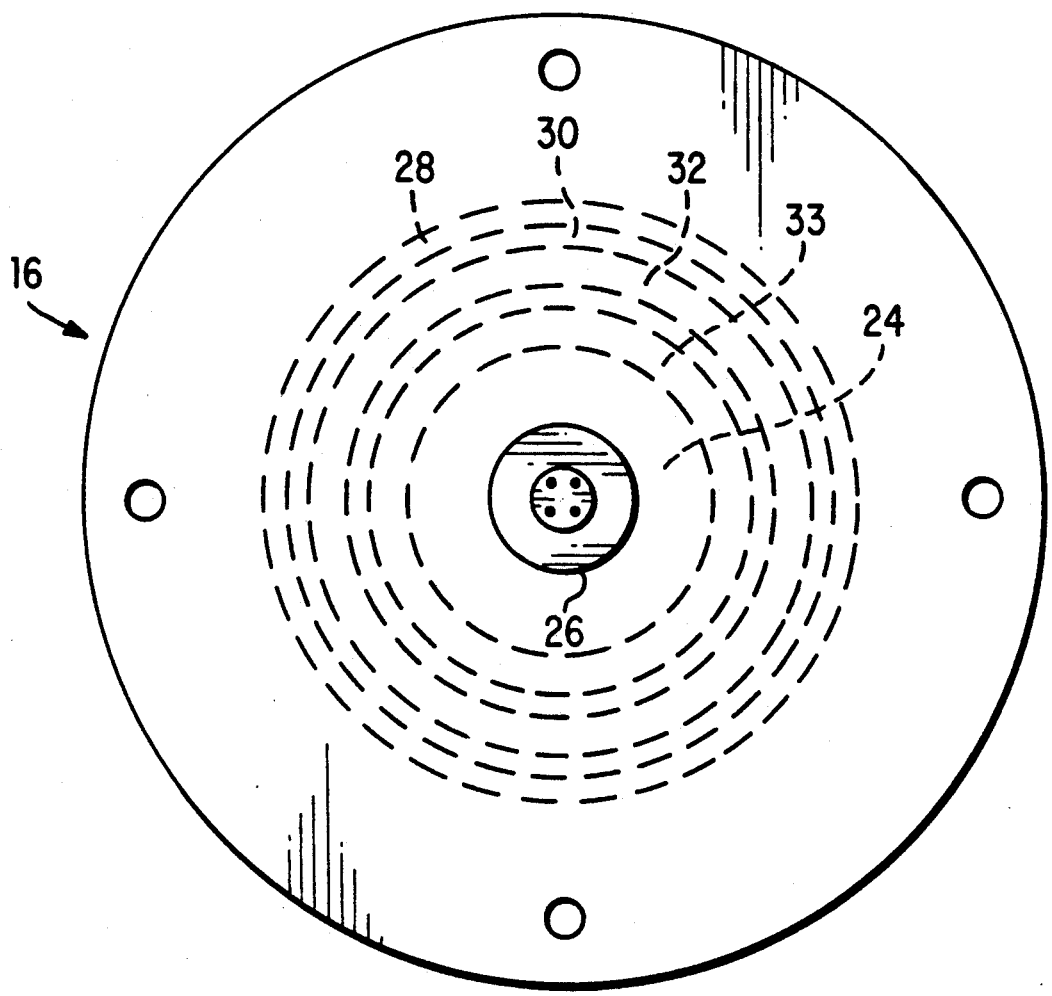
FIG. 3 is a detail front elevational view of the detector of FIG. 2 mounted in a tank wall.

FIG. 2 shows a detail side view of a portion of tank wall 14 incorporating detector 16. Detector 16 includes a sensor 22, an impulse coil 24, and a connector 26. Impulse coil 24 is an electro-impulse solenoid which functions as a vibration source. Coil 24 could also be a sonic transducer or mechanical actuator. Wall 14 is provided with an aperture in which detector 16 is seated. Detector 16 also includes a mounting flange 28, a seal gasket 30, a stainless cup-shaped member 32 defining a sensor cavity, a coil bracket 33, and a cover plate 34. Member 32 has a conductive surface and is mechanically coupled to wall 14 by suitable means such as by fasteners 20. Connector 26 is connected to controller 18, and a power supply (not shown). FIG. 3 shows a front elevational view of detector 16.

Sensor 22 is a piezofilm sensor which generates an electrical signal proportional to displacement forces exerted along its length.

Impulse coil 24, when subjected to a current pulse, generates an electrodynamic force upon the face of member 32, causing member 32 to deflect or vibrate. The manner in which the member 32 vibrates is related to the level of liquid within the tank and to the degree to which solid contaminants adhere to the outer surface of member 32. Thus, the output of sensor 22 in response to a current pulse supplied to coil 24 will vary, depending upon the liquid level in the tank and the degree of contamination.

Figure 4:
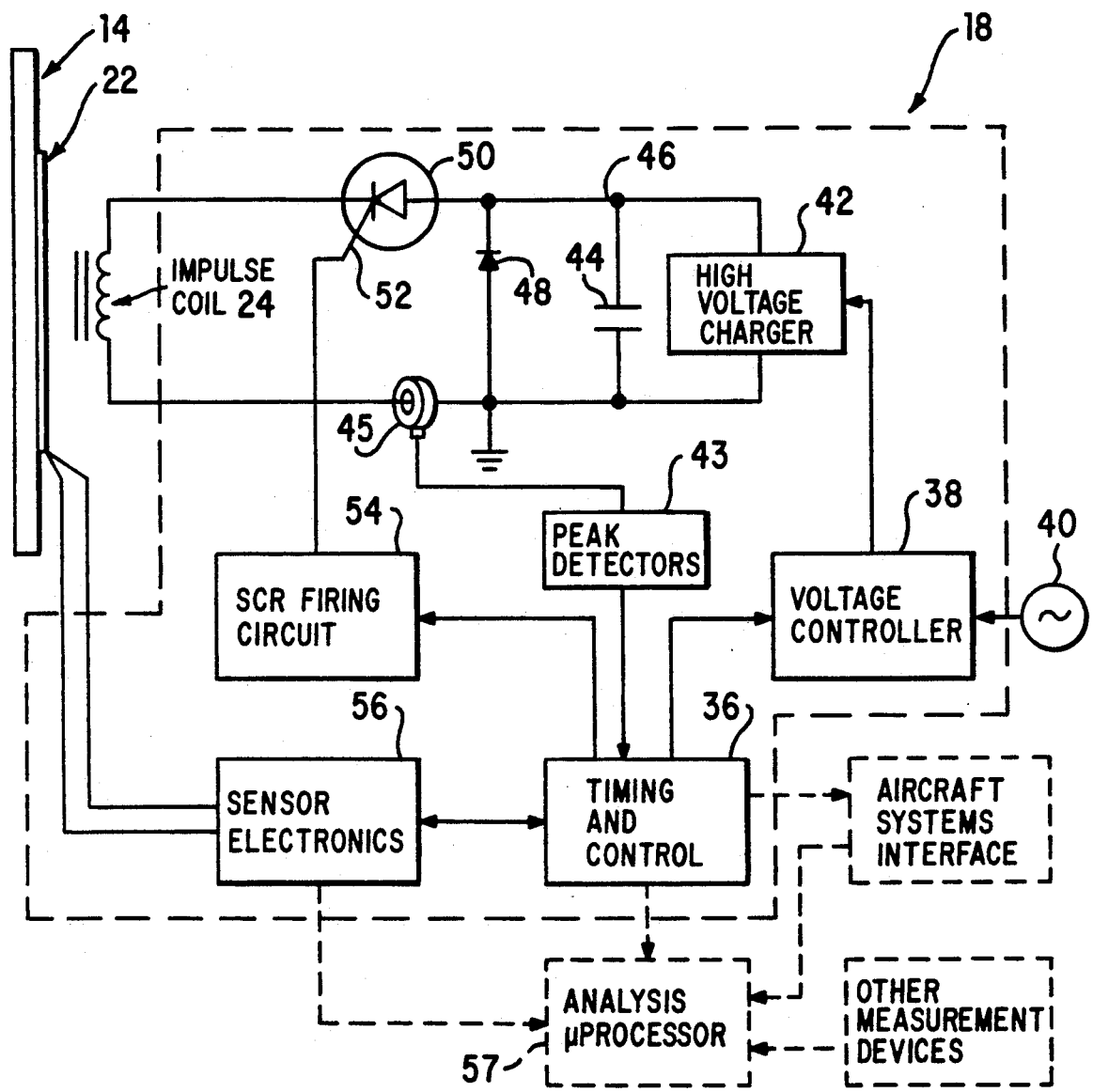
FIG. 4 is a block diagram of the detector and controller of FIG. 1.

FIG. 4 is a block diagram showing sensor 22, impulse coil 24, and the components of controller 18. Controller 18 includes a timing and control circuit 36, which in the preferred embodiment comprises a microprocessor control circuit employing a microprocessor such as a model 8031 commercially available from the Intel Corporation. Circuit 36 is connected to a voltage controller circuit 38. Circuit 38 receives power from a power supply 40 at a voltage of, for example 115 volts and, under control of control circuit 36, supplies electrical power to a high voltage charger circuit 42. Charger circuit 42 functions as a D.C. current source and converts the power supply voltage supplied as output from voltage controller 38 to a voltage of, for example, 20 volts D.C. which is supplied to a capacitor 44.

A diode 48 is connected in parallel with capacitor 44 for the purpose of clamping the waveform to a single unipolar pulse. This provides the optimum wave shape to excite sensor 22, while eliminating reverse voltage stresses on capacitor 44.

A silicon controlled rectifier (SCR) 50 has its current path connected in series with impulse coil 24. The combination of SCR 50 and impulse coil 24 is connected in parallel with diode 48, capacitor 44, and high voltage charger circuit 42.

Control terminal 52 of SCR 50 is connected to the output of an SCR firing circuit 54, the input of which is connected to timing and control circuit 36. Under the influence of timing and control circuit 36, capacitor 44 is charged to a high voltage by voltage controller 38 and high voltage charger 42. Timing and control circuit 36 then generates signals to SCR firing circuit 54 which activates the control terminal 52 of SCR 50, rendering SCR 50 conductive. This discharges capacitor 44 through impulse coil 24, generating a current pulse of a predetermined level of, for example, 200 amps. This current pulse, which constitutes a detection pulse, generates an electrodynamic force upon the surface of member 32. Member 32 is mechanically deflected as a result of this force, causing member 32 to vibrate and causing a signal to be generated at the output of piezofilm sensor 22. The signal from piezofilm sensor 22 is supplied to a sensor electronics circuit 56 which amplifies and conditions the signals output by piezofilm sensor 22 and supplies signals to timing and control circuit 36. These signals are interpreted by timing and control circuit 36 to determine the level of liquid in tank 10 and to sense the presence of contaminants upon the outer surface of member 32.

Optionally, a current transformer 45 and one or more peak detector circuits 47 may be provided to verify operation of controller 18. Output of circuit 47 is supplied as an input to timing and control circuit 36.

If contaminants are sensed, in a manner to be more completely described, timing and control circuit 36 generates signals to voltage controller 38 and SCR firing circuit 54 to cause pulses much larger than the predetermined level, for example, 2000 amps. at 200 volts, to be supplied to impulse coil 24. Such larger current pulses, which constitute removal pulses, provide correspondingly greater deflections of member 32, inducing vibrations which dislodge contaminants present on the outer surface of member 32.

The invention thus includes means responsive to input signals of first and second values for selectively applying first and second forces to a conductive surface mechanically coupled to the wall, the first force being less than the second force and the second force being operative to vibrate the wall sufficient to dislodge contaminants from the wall. Preferably, the responsive means comprises means responsive to input signals of first and second values for applying first and second electrodynamic forces. As embodied herein, the responsive means comprises impulse coil 24.

The invention also includes means for sensing a parameter which is a function of the input signal and of the level of fluid in the container. As embodied herein, the sensing means comprises piezofilm sensor 22.

The invention further includes means for generating an indicating signal representative of the parameter to indicate the contents level of the container. As embodied herein, the generating means comprises sensor electronics circuit 56.

Figure 5:
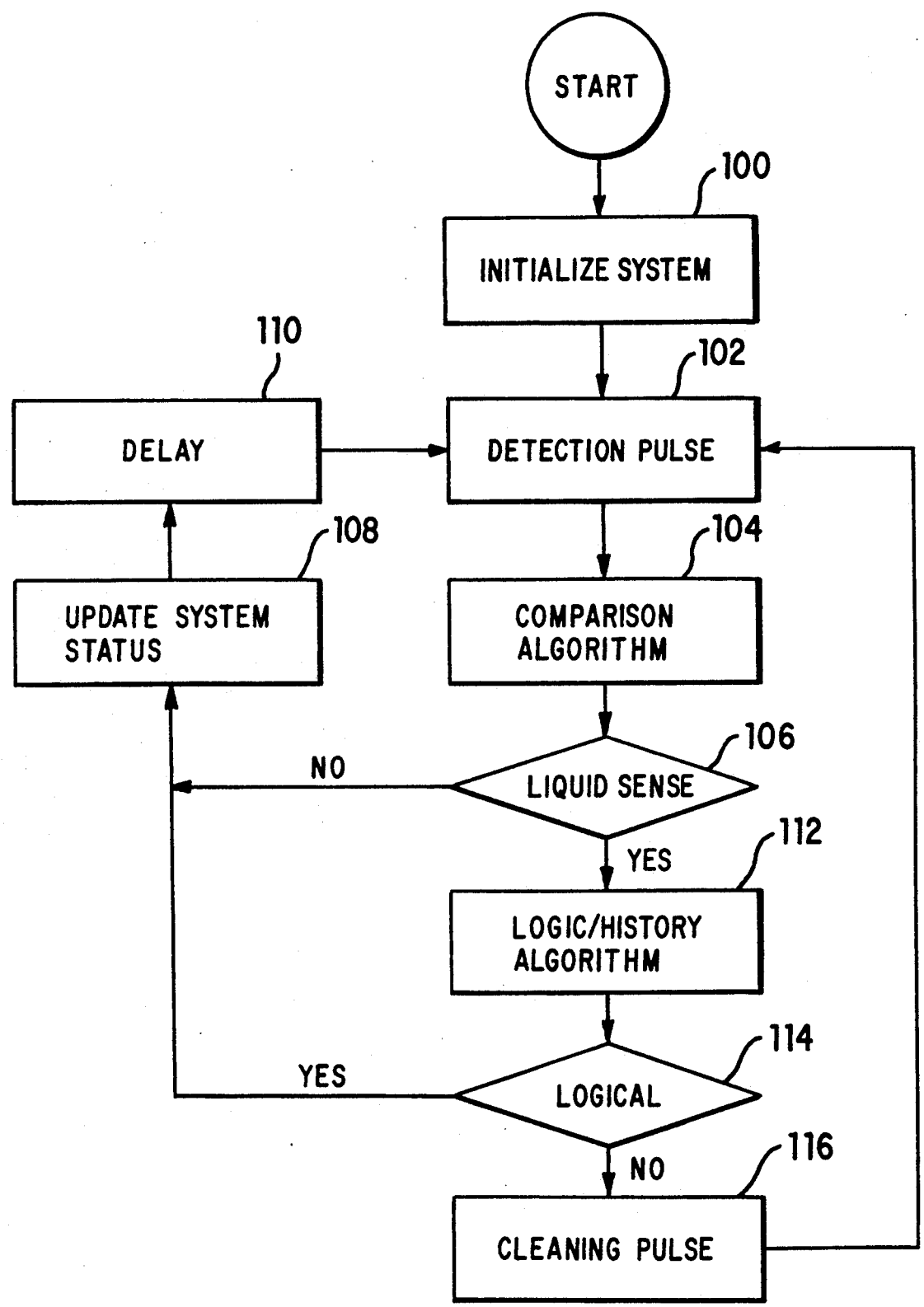
FIG. 5 is a logic flow diagram of the timing and control circuit of FIG. 4.

A logic flow diagram indicating the operation of timing and control circuit 36 is shown in FIG. 5. At block 100, system initialization procedures are performed to begin operation of the system. Such procedures are specific to the particular computer or microprocessor system selected for circuit 36 and are well known to those of ordinary skill in the art. Accordingly, such initialization procedures will not be described in detail.

At block 102, a detection pulse is generated to determine the level of liquid in the tank. The output of sensor 22 is analyzed by sensor electronics circuit 56, in a manner to be more completely described, at block 104 and a determination made at block 106 as to whether the output signal of sensor 22 indicates "tank full", that is, whether liquid in the tank has reached the level of member 32. If not, signals are generated at block 108 to indicate the low liquid level status of the system. After a delay provided by block 110, timing and control circuit 36 generates another detection pulse at block 102.

If the analysis performed at blocks 104 and 106 shows that the output signal of sensor 22 is indicating that liquid in the tank has reached the level of member 32, a logic/history analysis is performed at block 112. This analysis includes a reading of empty sensor 17 to determine if sensor 17 is providing an indication of an empty tank. If so, this is an indication that liquid in the tank has not yet reached the level of member 32, and that the "tank full" signal provided by sensor electronics circuit 56 is due to the presence of contaminants upon the outer surface of member 32.

Other factors evaluated at block 112 to determine if the output of sensor 22 accurately indicates "tank full" may include the time since the tank was last emptied and the number of flushes since the tank was last emptied. If such time or flush number values are less than a predetermined limit value, this is also an indication that the "full" indication provided by sensor electronics circuit 56 does not indicate a true full condition, but rather that the outer surface of member 32 is contaminated. The output of block 112 is thus supplied to block 114, where determination is made of whether the "full" signal generated by sensor electronics circuit 56 is reasonable, or logical. If the determination at block 114 is that the "full" signal is indeed logical, program flow returns to block 108. On the other hand, if the determination at block 114 is that the "full" signal is a spurious indication, then block 116 is executed to generate a high-level, or cleaning, pulse to coil 24. Control then returns to block 102 where a low-level, or detection, pulse is generated.

If a "full" signal is still received, timing and control circuit 36 will generate a predetermined number of cleaning pulses, to attempt to dislodge contaminants from the outer surface of member 32. If such efforts are not successful after such predetermined number of cleaning pulses, as indicated by a continuously supplied "full" signal from sensor electronics circuit 56, the system, at block 112, changes criteria such that the outcome of block 114 will result in a "full" status being supplied, through block 108.

Alternatively, the system may generate a cleaning pulse prior to a detection pulse. That is, a large current pulse is supplied to impulse coil 24 to dislodge any contaminants present at the surface of member 32. Following such cleaning pulse, a detection pulse, that is, a low-level pulse, may then be supplied to reliably detect the level of fluid within the tank.

The invention in another aspect thus provides a method for detecting a level of liquid in a container. The method includes a step of applying to a conductive surface mechanically coupled to a portion of the wall of the container, a first electrodynamic force having a first value for vibrating the wall portion sufficiently to dislodge contaminants from the wall portion, the step of applying to the conductive surface a second electrodynamic force having a second value less than the first value, and the step of sensing a response of the conductive surface to the second force for determining the level of liquid in the container.

In an optional configuration, sensor electronics circuit 56 may detect output signals of sensor 22 caused by pressure changes in the tank due to flushes of, for example, lavatory commodes whose plumbing is connected to the tank. In modern aircraft vacuum waste systems, the pressure in the tank cycles rapidly when the toilets are flushed. Such pressure changes yield readily recognizable output signals from sensor 22, and are thus a reliable indication of tank flush operations. Such information is then transmitted from timing and control circuit 36 to an analysis processor 57 outside of controller 18.

Figure 6A:
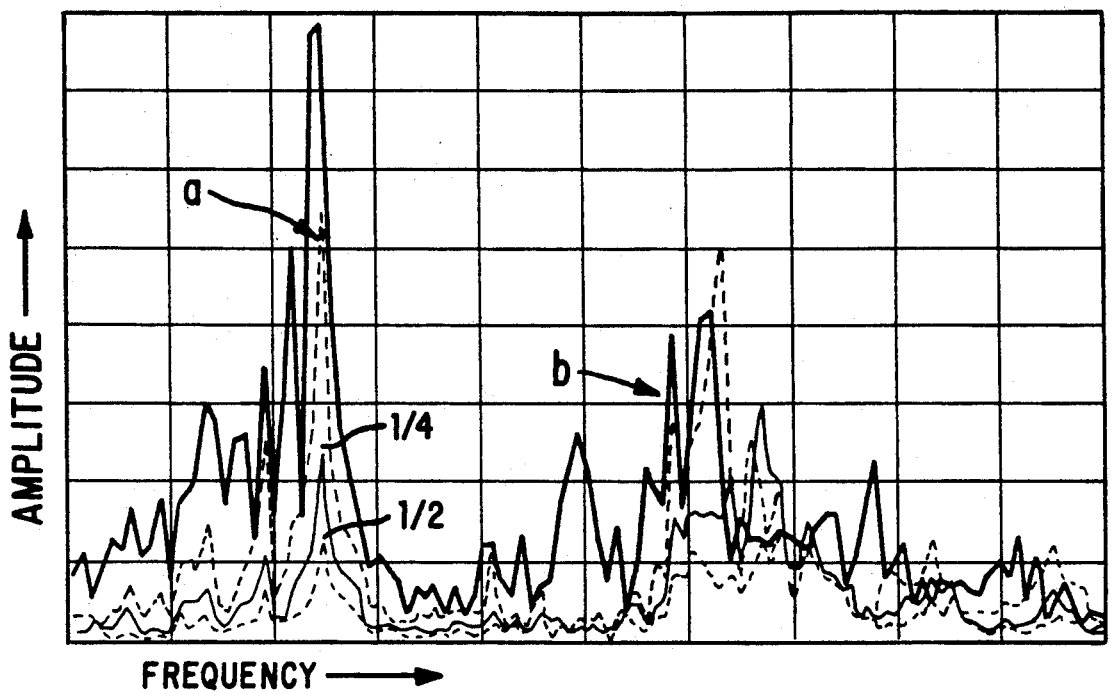
FIGS. 6A and 6B are graphs of the response of the sensor shown in FIG. 2, respectively showing conditions of no contamination and contamination.
Figure 6B:
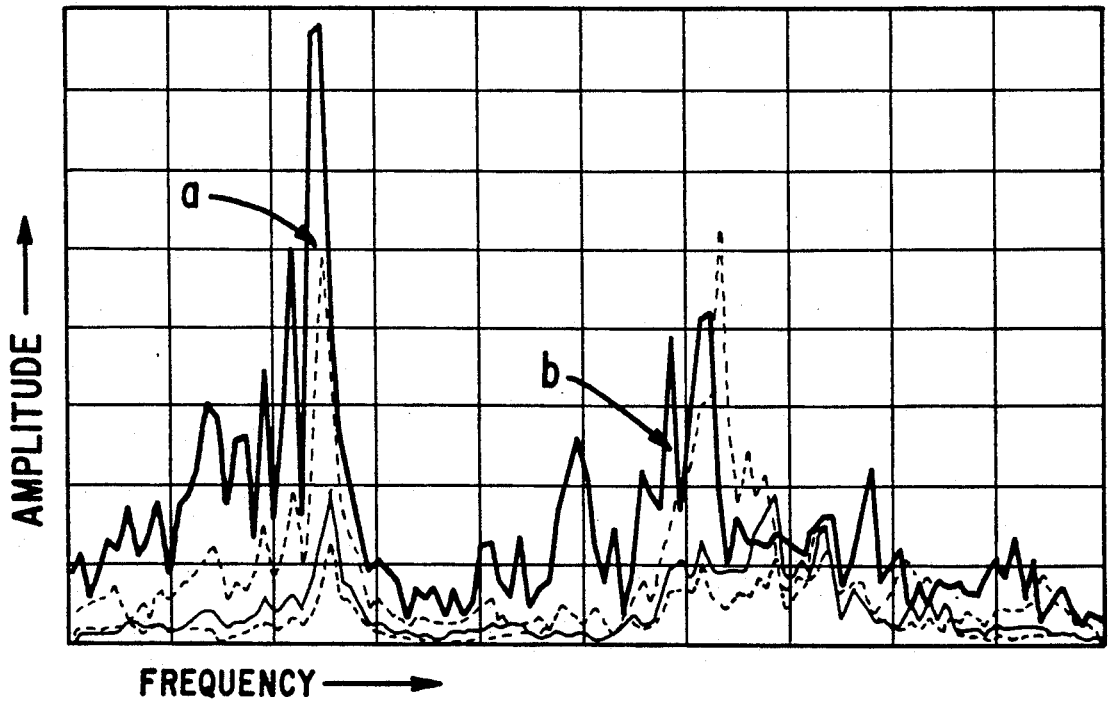

FIGS. 6A and 6B are graphs illustrating the response of sensor 22 to a current pulse supplied to impulse coil 24, which generates a pulse of electrodynamic force upon member 32. The vertical axis FIGS. 6A and 6B represents acceleration in the units of g's, and the horizontal axis represents frequency. FIG. 6A shows the response when sensor 22 is uncontaminated, and FIG. 6B shows the response when sensor 22 is contaminated with deposits of solid material.

FIGS. 6A and 6B show that a plurality of vibrational modes are exhibited by member 32 in response to a current pulse, such modes being a function of frequency. Each mode is indicated in FIGS. 6A and 6B by a peaked response. The actual response of member 32 will of course depend upon the specific configuration of each installation, that is, the size of the tank, the thickness of tank walls, tank material, etc. However, FIGS. 6A and 6B are representative of responses obtained to electrodynamic forces produced by current pulses. The modal response indicated at a in FIGS. 6A and 6B is a mode which responds in a linear fashion to variations in fluid levels as shown by the various peak responses. The linear response at a in FIG. 6A persists and remains at the same frequency, despite the presence of contaminants on sensor 22, as shown by peak responses at a in FIG. 6B.

The modal response indicated at b of FIG. 6A also exhibits a linear response at various fluid levels. However, the frequency of the modal response indicated at b of FIG. 6A varies with the existence of contaminants on sensor 22. This is shown by comparison of FIGS. 6A and 6B, where it can be seen that the peak responses at b of FIG. 6B exhibit a modal shift, or displacement to the right, representing non-linear responses to contamination. Thus, the modal responses indicated at b of FIG. 6B are increased in frequency (shifted to the right) by the presence of contaminants on sensor 22. Thus, there is a linear relationship between the a and b modal responses when sensor 22 is clean, and a non-linear relationship between a and b modal responses when sensor 22 is contaminated.

Figure 7:
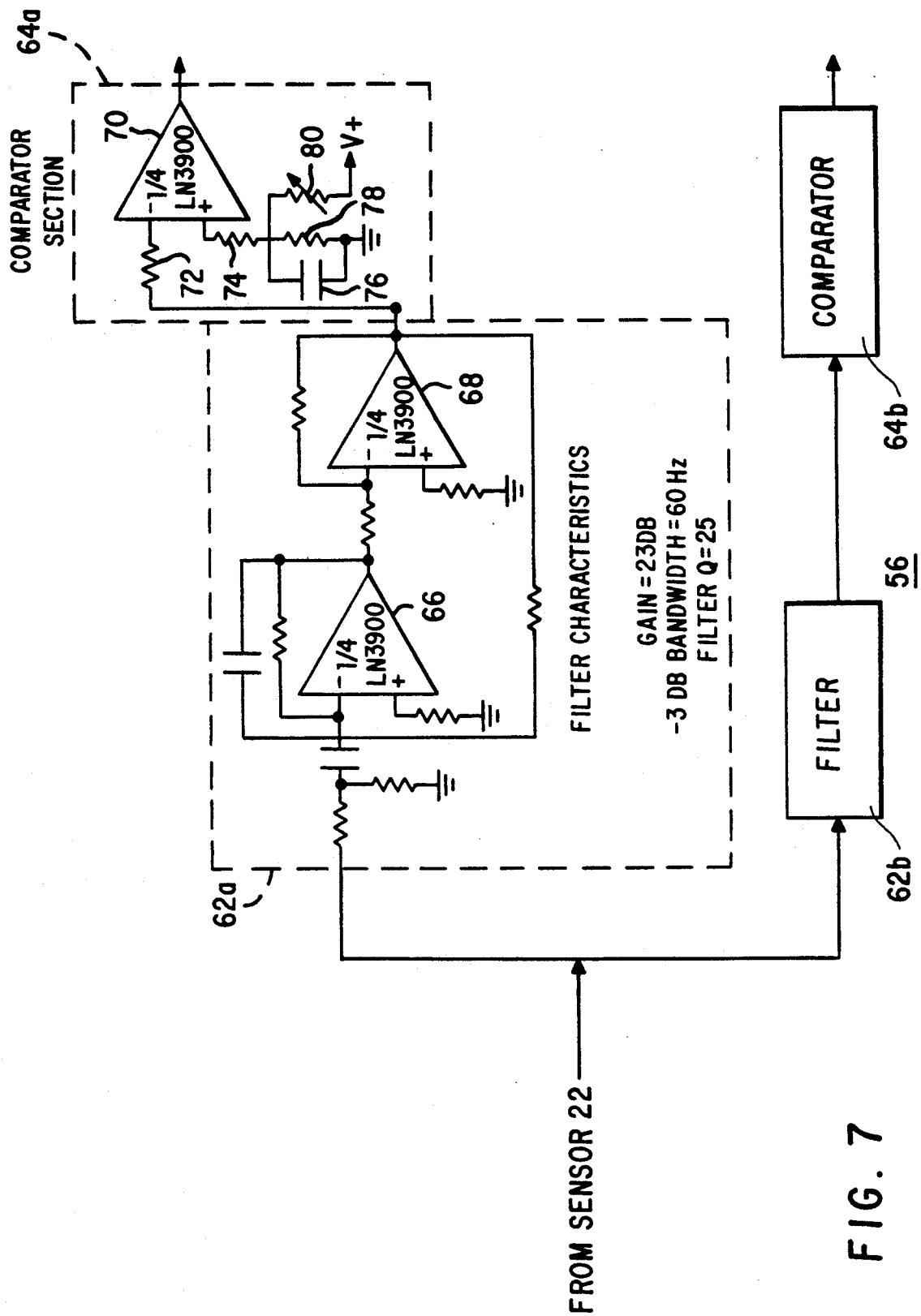
FIG. 7 is an electrical schematic diagram of the sensor electronics of FIG. 4.

FIG. 7 is an electrical schematic diagram of sensor electronics circuit 56. Circuit 56, in the preferred embodiment, includes a pair of narrow bandpass filters 62a and 62b and a pair of comparator circuits 64a and 64b. Filter 62a is tuned to monitor a portion of the wideband frequency vibrations of member 32, for example, the mode response signals shown at a in FIGS. 6A and 6B, as detected by sensor 22. Filters 62a and 62b in the described embodiment thus may have respective center frequencies of 900 Hz. and 1600 Hz, a gain of 23 dB, a −3 dB bandwidth of 60 Hz, and a Q of 25. Filters 62a and 62b are of conventional construction and are identical, except for specific component values. Therefore, only filter 62a is shown in detail in FIG. 7.

Filter 62a includes operational amplifiers 66 and 68 which may be, for example, two parts of a quad operational amplifier LM3900 obtainable from the National Semiconductor Corporation. The value of components associated with amplifiers 66 and 68 in filter 62a are selected in accordance with design parameters to obtain the previously described filter characteristics. Such design parameters are well-known and are published, for example, in Application Notes of the LM3900 published by National Seniconductor Corporation.

Comparator circuits 64a and 64b are of identical construction. Thus only comparator 64a is shown in detail in FIG. 7. Comparator 64a is connected to the output of amplifier 68 and includes an operational amplifier 70 connected as a comparator. Amplifier 70 may also be a portion of a quad operational amplifier LM3900. An input resistor 72 is connected in series with the output of amplifier 68 and the inverting input of amplifier 70. The non-inverting input of amplifier 70 is connected to a reference circuit including resistor 74, capacitor 76, resistor 78, and resistor 80. Resistor 80 is an adjustable resistor connected in series between resistor 74 and a source of operating voltage (not shown). Values of components 72 through 80 are well-known, and are selected according to design principles such as those published in the aforementioned Application Notes.

Resistor 80 of comparator 64a is adjusted so that the output of amplifier 70, which is normally at a logic high level, switches to a logic low level upon detection of a predetermined fluid level. That is, the output of amplifier 70 is at a logic high level whenever the amplitude of responses shown at.a in FIG. 6 is above a predetermined level. As fluid level increases, the amplitude of responses at a in FIG. 6 as detected by filter 62a drops off sharply. Accordingly, the output of amplifier 70 of comparator 64a will reliably change state upon detection of fluid level above the predetermined level.

The design of the responses of filter 62a and 62b are not limited to detection of any specific mode but may be modified to detect any modal response peak desired, as dictated by the specific application. Moreover, in certain applications, more sophisticated analysis of the output of sensor 22 may be desirable.

Similarly, the presence of contaminants on the surface of sensor 22 will cause the amplitude of modal responses shown at b in FIGS. 6A and 6B, as detected by filter 62b, to drop off sharply. The output of comparator 64b will thus reliably change state upon detection of presence of contaminants on the surface of sensor 22. The outputs of comparators 64a and 64b are supplied to timing and control circuit 36 (FIG. 4) for analysis.

Depending upon the specific configuration of container 14 and the particular type of fluids and contaminants being monitored, additional filters and comparators may be required, along with more sophisticated analysis. For example, digital signal processing techniques may be necessary or desirable in certain configurations to reduce fault signals, compensate for fatigue life of sensor components, and compensate for electromagnetic interference and noise. In such applications, the outputs of circuit 56 may be supplied to a more powerful analysis processor 57. However, the principles incorporated in such additional filter, comparator, and processor apparatus are as set forth for the described embodiment.

Although the invention has been described in relation to aircraft effluent holding tanks, it could apply to any environment with a solid contaminated liquid measurement problem. This could include water transportation, ground transportation, paper pulp, oil, sewage processing, and many other industries.

It will be apparent to those of ordinary skill in the art that various modifications and variations can be made to the above-describe embodiments without departing from the scope of the appended claims and their equivalents.

We claim:

1. Apparatus for detecting the contents level of a container having a wall subject to fouling by contaminants, including a wall portion having a conductive surface, comprising:

first responsive means, coupled to the conductive surface and responsive to input signals of first and second values, for selectively applying signals of first and second forces to the conductive surface, the first force being less than the second force and the second force being operative to vibrate the wall portion sufficient to dislodge contaminants from the wall portion;

sensing means, positioned adjacent to the conductive surface, for sensing a parameter which is a function of the forces and of the contents level of the container; and means for generating an indicating signal representative of the parameter to indicate the contents level of the container;

wherein said sensing means has an output and wherein said means for generating an indicating signal comprises second responsive means, responsive to the frequency and amplitude of the output of said sensing means, for generating a fluids-status indicating signal indicative of the presence of contents and a contaminants-status indicating signal indicative of the presence of contaminants;

wherein said second responsive means comprises third responsive means, responsive to a first modal response of the output of said sensing means which exhibits a linear response to variations in content level of the container in the presence of contaminants, for generating the fluids-status indicating signal and fourth responsive means, responsive to a second modal response which exhibits a non-linear response to the content level of the container in the presence of contaminants, for generating the contaminants-status indicating signal.

2. Apparatus as recited in claim 1 wherein the first responsive means comprises means responsive to input signals of first and second values for selectively applying first and second electrodynamic forces to the conductive surface.

3. Apparatus as recited in claim 2, wherein the first responsive means comprises an electro-impulse solenoid.

4. Apparatus as recited in claim 1 wherein the sensing means comprises means for sensing vibrations in the wall portion.

5. Apparatus as recited in claim 4 wherein the sensing means comprises a piezofilm sensor.

6. Apparatus as recited in claim 1 wherein said third and fourth responsive means each comprise a frequency responsive filter having an output, and a comparator connected to the output of said filter.

7. Apparatus as recited in claim 6 wherein said second responsive means provides an indication of contaminants when said first and second modal responses exhibit a non-linear relationship.

8. Apparatus for containing liquid and for indicating the contents level thereof, comprising:

a container having at least one wall subject to fouling by contaminants, said wall having a portion including a conductive surface;

means for selectively generating input signals of first and second values;

first responsive means, coupled to the conductive surface and responsive to the input signals of first and second values, for selectively applying first and second forces to said conductive surface, the first force being less than the second force and the second force being operative to vibrate the wall portion sufficient to dislodge contaminants from the wall portion;

sensing means, positioned adjacent to the conductive surface, for sensing a parameter which is a function of the forces and of the contents level of the container; and means for generating an indicating signal representative of the parameter to indicate the contents level of the container;

wherein said sensing means has an output and wherein said means for generating an indicating signal comprises second responsive means, responsive to the frequency and amplitude of the output of said sensing means, for generating a fluids-status indicating signal indicative of the presence of contents and a contaminants-status indicating signal indicative of the presence of contaminants;

wherein said second responsive means comprises third responsive means, responsive to a first modal response of the output of said sensing means which exhibits a linear response to variations in content level of the container in the presence of contaminants, for generating the fluids-status indicating signal, and fourth responsive means, responsive to a second modal response which exhibits a non-linear response to the content level of the container in the presence of contaminants, for generating the contaminants-status indicating signal.

9. Apparatus as recited in claim 8 wherein the first responsive means comprises means for selectively applying first and second electrodynamic forces to the conductive surface.

10. Apparatus as recited in claim 9, wherein the first responsive means comprises an electro-impulse solenoid.

11. Apparatus as recited in claim 8 wherein the sensing means comprises means for sensing vibrations in the wall portion.

12. Apparatus as recited in claim 11 wherein the sensing means comprises a piezofilm sensor.

13. Apparatus as recited in claim 8 wherein said third and fourth responsive means each comprise a frequency responsive filter having an output, and a comparator connected to the output of said filter.

14. Apparatus as recited in claim 13, wherein said second responsive means provides an indication of contaminants when said first and second modal responses exhibit a non-linear relationship.

15. A method for detecting the contents level of a container including a wall subject to fouling by contaminants, comprising:
 a first step of generating an input signal to apply to the wall a first mechanical force representative of the input signal;
 a second step of detecting a first parameter which is a function of the first mechanical force and which is indicative of a tentative contents level of the container;
 a third step of generating a level-indicating signal from the detected first parameter if the detected first parameter is below a predetermined value;
 a fourth step of detecting a second parameter indicative of contamination of the container;
 a fifth step of generating a contaminants-indicating signal from the detected second parameter if the detected second parameter is below a predetermined value; and
 a sixth step of analyzing the level-indicating signal and the contaminants-indicating signal for determining a status signal indicating the reliability of the level-indicating signal.

16. A method as recited in claim 15 wherein the first step comprises supplying a current pulse to an electro-impulse solenoid mechanically coupled to the wall.

17. A method as recited in claim 16 wherein the container comprises a container in a lavatory system subject to flushing operations and the second parameter comprises a number of flushing operations.

18. A method as recited in claim 16 wherein the container comprises a container in a lavatory system subject to emptying operations and the second parameter comprises the time period since the last emptying operation.

19. A method as recited in claim 15 including, after the analyzing step, a step of:
 applying to a conductive surface mechanically coupled to a portion of the wall of the container
 a second mechanical force, having a value greater than the value of the first mechanical force, vibrating the wall portion sufficiently to dislodge contaminants from the wall portion, if the status signal indicates unreliability of the level-indicating signal.

20. A method as recited in claim 19 wherein said first and second parameters respectively include first and second modal responses of the conductive surface to the first mechanical force, the first modal response exhibiting a linear response to the contents level of the container in the presence of contaminants and the second modal response exhibiting a non-linear response to the contents level of the container in the presence of contaminants.

21. A method as recited in claim 15, further comprising,
 performing a first iteration of the first through fifth steps with respect to a first sensor positioned at a first location on the wall;
 performing a second iteration of the first through fifth steps with respect to a second sensor positioned at a second location on the wall;
 wherein the sixth step includes analyzing the indicating signal generated from the first and second iterations; and
 a step of generating an input signal to apply to the wall a second mechanical force greater than the first mechanical force and sufficient to dislodge contaminants from the wall if the analysis of the first and second iterations indicates the presence of contaminants.

22. A method as recited in claim 21 comprising the additional step of performing another iteration of the first through sixth steps.

* * * * *

UNITED STATES PATENT AND TRADEMARK OFFICE
CERTIFICATE OF CORRECTION

PATENT NO. : 5,035,140
DATED : July 30, 1991
INVENTOR(S) : James W. Daniels et al.

It is certified that error appears in the above-identified patent and that said Letters Patent is hereby corrected as shown below:

Claim 1, column 7, line 56, after "applying" delete --signal of--.

Claim 19, column 10, lines 20, after "force," insert --for--.

Signed and Sealed this

Thirtieth Day of March, 1993

Attest:

STEPHEN G. KUNIN

*Attesting Officer*  *Acting Commissioner of Patents and Trademarks*